Feb. 28, 1950    H. PFEIFFER    2,499,160
PLIER TUBE BENDER
Filed Sept. 8, 1947

INVENTOR.
Henry Pfeiffer
BY Victor J. Evans & Co.
ATTORNEYS

Patented Feb. 28, 1950

2,499,160

UNITED STATES PATENT OFFICE 2,499,160

PLIER TUBE BENDER

Henry Pfeiffer, Fredericksburg, Tex.

Application September 8, 1947, Serial No. 772,752

1 Claim. (Cl. 81—15)

This invention relates to a plier tube bender.

It is an object of the present invention to provide a hand tool which is adapted to be clamped about a pipe and which has extensions thereon over which a pipe may be bent to give the same an elbow turn and without the need of other tools to effect the operation.

Other objects of the present invention are to provide a plier type of tool adapted for the bending of tubing which is of simple construction, inexpensive to manufacture and convenient to use.

For other objects and for a better understanding of the invention, reference may be had to the following detailed description taken in connection with the accompanying drawing, in which Fig. 1 is a side elevational view of my plier type bending tool showing how the pipe is fixed to the same and before the pipe has been bent downwardly over curved portions thereof.

Figure 1:
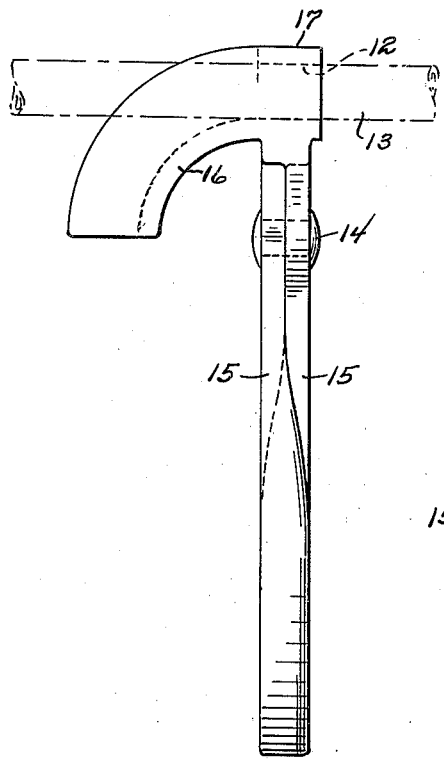
Figure 2:
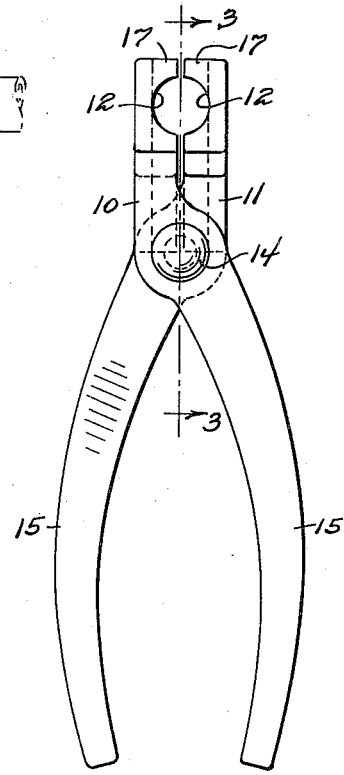
Fig. 2 is a front elevational view of my pipe bending tool.
Figure 3:
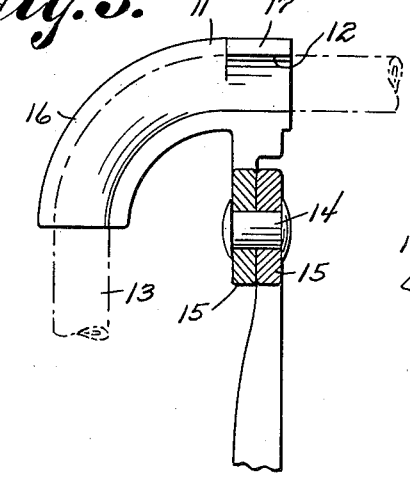
Fig. 3 is a cross-sectional view of my pipe bending tool taken generally along line 3—3 of Fig. 2 and showing the pipe after it has been bent over the curved portions of the tool.
Figure 4:
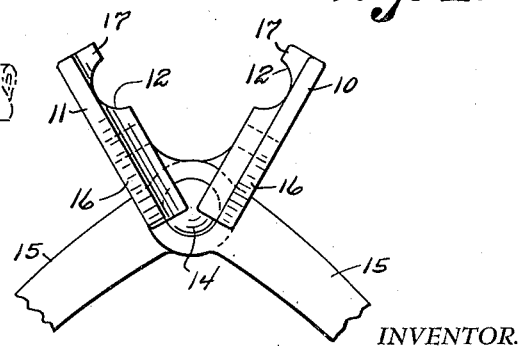
Fig. 4 is a front elevational view after the jaws have been expanded to receive the tube.

Referring now to the figures, 10 and 11 represent jaws having respectively opposing openings 12 for receiving a pipe 13 of bendable material. These jaws are pivoted together by a rivet or pivot pin 14 and are operated by handles 15 in the same manner that ordinary pliers are operated. With the hand about the handles 15 and the pipe tightly clamped, the pipe 13 can be bent downwardly from one side of the jaws to be given a curved turn so that it will assume the shape as shown in Fig. 3.

Extending from each of the jaws 10 and 11 are curved and internally grooved formations 16 adapted to receive the pipe 13 to shape it. After the pipe has been bent over the curved portion 16, the jaws 10 and 11 are released and the pipe can be removed. The top of the curved portions are open so that the pipe can be drawn down onto the curved formations whereas the upper ends of the jaws, as indicated at 17, are extended over the top of the pipe to retain the pipe while the bending action is effected thereon.

While various changes may be made in the detail construction, it shall be understood that such changes shall be within the spirit and scope of the present invention as defined by the appended claim.

I claim:

A bending plier comprising a pair of curved handles, semi-cylindrical jaws on said handles and said handles hinged together so that when said handles are moved toward each other said jaws are adapted to surround a pipe or rod to be bent, and curved extensions extending from the sides of the respective jaws and grooved to receive the pipe or rod as it is bent downwardly from its connection with the jaws whereby to provide a bend in the pipe or rod, said curved portions being open at the top to permit the extension of the pipe or rod downwardly over the curved extensions and into the grooves thereof.

HENRY PFEIFFER.

REFERENCES CITED

The following references are of record in the file of this patent:

UNITED STATES PATENTS

| Number | Name | Date |
|---|---|---|
| 715,915 | White | Dec. 16, 1902 |
| 1,775,335 | Wiggins | Sept. 9, 1930 |
| 1,878,754 | Buchanan | Sept. 20, 1932 |
| 2,381,064 | Lewin | Aug. 7, 1945 |